Jan. 14, 1930.  T. R. HARRISON  1,743,853
METER
Filed Dec. 29, 1925  3 Sheets-Sheet 1
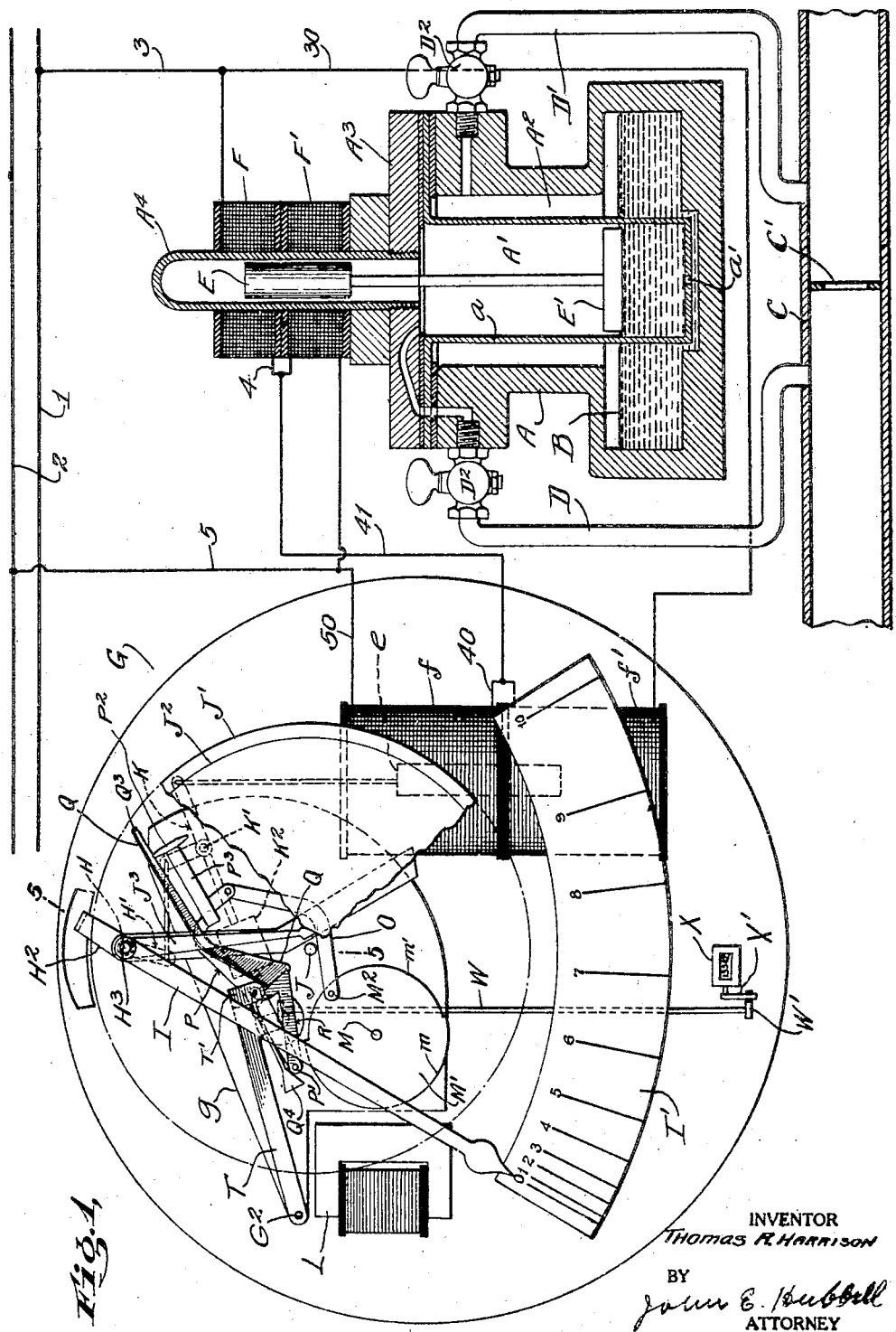

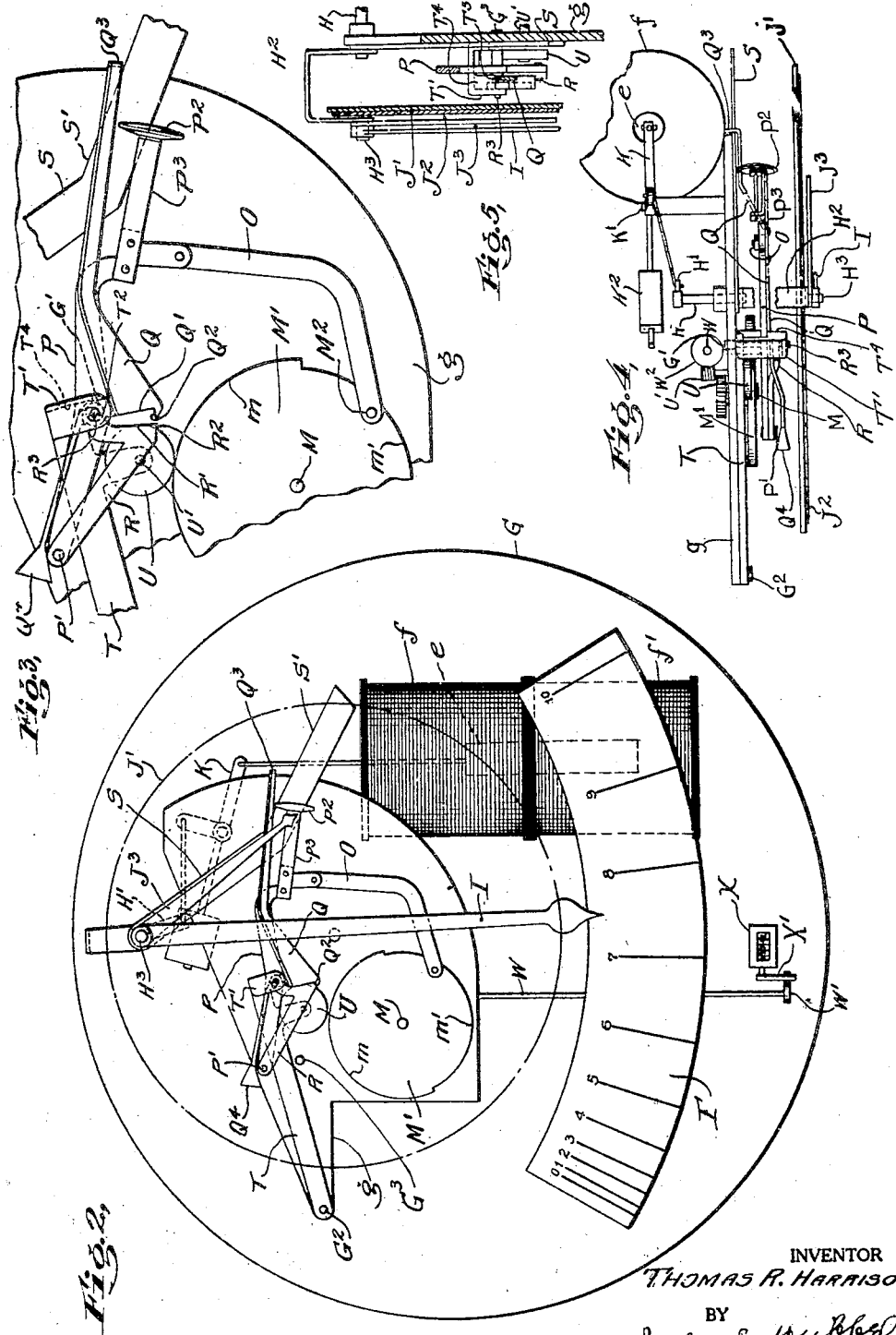

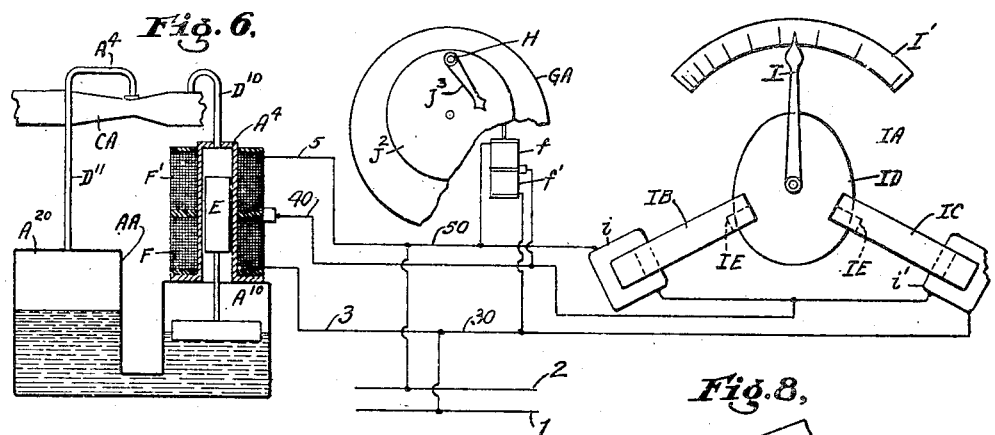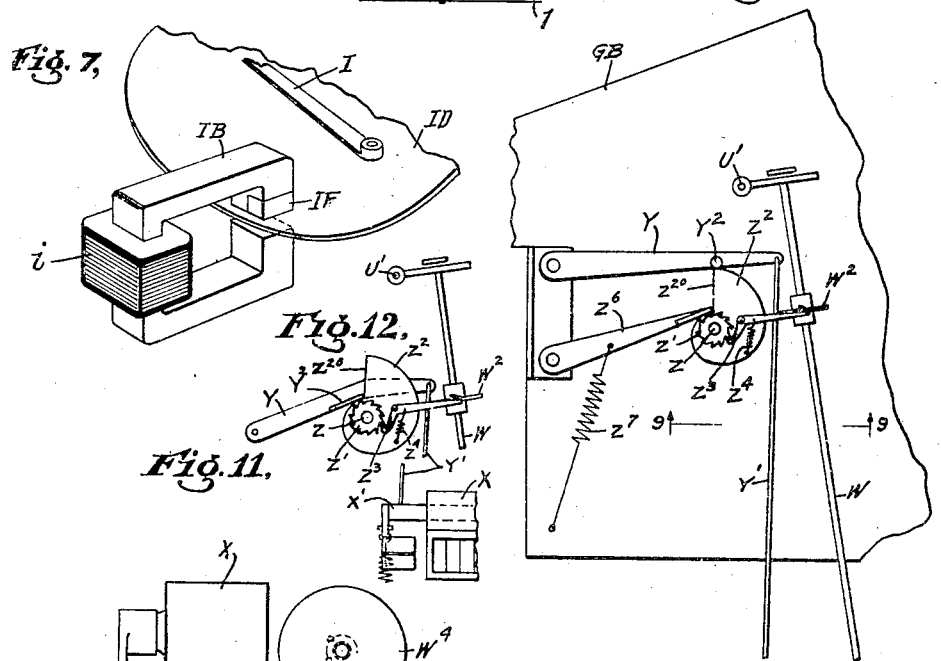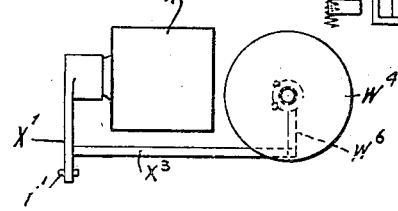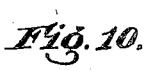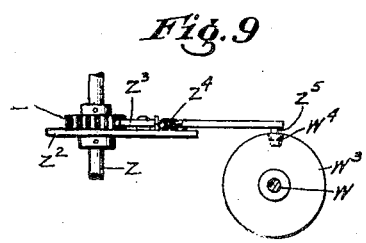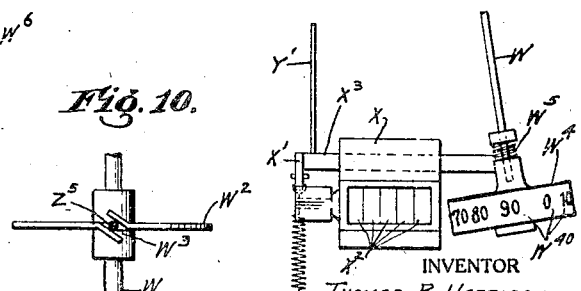

Patented Jan. 14, 1930

1,743,853

UNITED STATES PATENT OFFICE

THOMAS R. HARRISON, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

METER

Application filed December 29, 1925. Serial No. 78,148.

The general object of the present invention is to provide an improved meter mechanism, and the invention claimed herein comprises improvements in the exhibiting mechanism portion of the meter, rather than in the manner in which variations in the quantity metered actuate the exhibiting mechanism. A more specific object of the invention is to provide an integrating mechanism of novel form, which is characterized by its comparative simplicity and reliability, and by its availability for use in a flow meter. The invention is further characterized by the advantageous manner in which integrating, indicating, and recording elements are combined.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 1 is a somewhat diagrammatic representation of a flow meter with parts broken away and in section;

Fig. 2 is an elevation of the indicating, recording and integrating portion of the apparatus shown in Fig. 1, with parts in different relative positions;

Fig. 3 is an elevation of a portion of the apparatus taken on a larger scale than Figs. 1 and 2, and showing parts in other relative positions;

Fig. 4 is a plan view of the apparatus;

Fig. 5 is a partial section on the line 5—5 of Fig. 1;

Fig. 6 is a diagrammatic representation of a modified construction;

Fig. 7 is a perspective view of a portion of the apparatus shown in Fig. 6;

Fig. 8 is an elevation with parts removed, of apparatus comprising integrator actuating mechanism differing from that shown in Figs. 1 to 5;

Fig. 9 is a partial section on the line 9—9 of Fig. 8;

Fig. 10 is an enlarged view of a portion of the apparatus shown in Fig. 8;

Fig. 11 is an end view of a portion of the integrating mechanism shown in Fig. 8; and Fig. 12 is a view taken similarly to, and illustrating a modification of the apparatus shown in Fig. 8.

My improved instrument in the form shown in the drawings, comprises an indicating, recording and integrating portion collectively designated by the symbol G, and an actuator which is a differential pressure device A, when the instrument, as in the form shown, is intended for measuring fluid rate of flow. The differential pressure device A, as shown, comprises a casing body which may be described as cup-shaped and which has its interior divided into two chambers $A'$ and $A^2$ by a suitable partition wall. The latter, as shown, is formed by a cup-shaped part $a$, of sheet metal comprising a vertically disposed cylindrical body portion which surrounds the chamber $A'$. The part $a$ has an out-turned flange at its open upper end which is clamped against the upper end of the casing body by a clamping head $A^3$, and said flange closes the upper end of the chamber $A^2$ which surrounds and extends beneath the lower end of the chamber $A'$. Advantageously, as shown, the lower portion of chamber $A^2$ is enlarged to hold a sufficiently large quantity of a suitable sealing liquid B. The particular liquid B employed will vary with the conditions of use and for many purposes may well be mercury. The chambers $A'$ and $A^2$ may be in free communication at their lower ends, but as shown they are in communication through a restricted orifice $a'$ formed in the otherwise closed bottom of the member $a$.

In the use of the apparatus to measure the flow of a fluid through a conduit C, the chambers $A'$ and $A^2$ are connected by pipes D and $D'$, respectively, to the conduit C at points thereof between which there is a difference of pressure which is a function of the fluid rate of flow through the conduit. As shown, the pipe D connects the chamber $A'$ to the conduit C at the down-flow or outlet side of a restricted orifice C' in the conduit C, while the pipe D' connects the chamber A² to the conduit C at the up-flow or inlet side of the orifice C'. D² represents normally open cut off valves in the pipes D and D'.

With the described arrangement, as the flow through the conduit C increases, the difference between the pressures transmitted to the chambers A' and A² of the device A increases approximately in proportion to the square root of the change in velocity or volume of flow through the orifice C'. As this pressure difference increases, the sealing liquid is transferred from the chamber A² to the chamber A' through the orifice a', and thereby gives movement to a float E' resting on the sealing liquid in the chamber A'. The movement of the float E' thus produced gives corresponding movements to an electro-magnetic core body E supported by the float E' through a connecting stem part. The core is movably received in and guided by a casing member A⁴ of non-magnetic metal and shown as a tubular part having its upper end closed and having its lower open end secured in an aperture formed for the purpose in the clamping head A³ which with the part A⁴ closes the upper end of the chamber A'.

The indicating recording and integrating section G of the instrument comprises a vertically movable magnetic core e to which the movements of the core E are transmitted by electro-magnetic means. The last mentioned means in the preferred construction illustrated, comprises what I call an impedance bridge which includes two coils F and F' surrounding the member A⁴ and placed one above the other and so disposed that as the core E is moved up and down by the change in sealing liquid level in the chamber A', the inductance of the coil F is increased or decreased, respectively, relative to the inductance of the coil F'. The impedance bridge also includes two coils f and f' arranged one above the other and surrounding the core e and so connected into the impedance bridge that when the movement of the core E unbalances the impedance bridge by varying the inductance of the coil F relative to that of the coil F', the electro-magnetic interaction between the core e and the coils f and f' will move the core e downward or upward accordingly as the movement of the core E is upward or downward, respectively, as required to re-balance the impedance bridge.

To this end the coils F and F' are connected in series between alternating current supply conductors 1 and 2 as by conductors 3, 4 and 5, while the coils f' and f are similarly connected in series between the conductors 1 and 2 by branches 30 and 50, respectively, from the conductors 3, and 5, and by a conductor 40. The conductors 4 and 40 are directly connected by a conductor 41. With this arrangement the coils F and f' are connected in parallel with one another between the supply conductor 1 and the conductor 41, while the coils F' and f are connected in parallel with one another between the conductor 41 and supply conductor 2.

With the described circuit connections, when the core E' moves upward in response to an increase in the rate of flow through the conduit C, the inductance of the coil F is increased and the inductance of the coil F' is decreased. This results in a decrease in the current flow through the coils F and f and an increase in the current flow through the coils F' and f'. With the core e balanced against the action of gravity as it should be, the increase of current flow in the coil f' relative to the current flow in the coil f moves the core e downward until the opposing electro-magnetic interactions between the core and coils f and f' are equal to one another in intensity. This condition is reached when the ratio of the inductances of the coils f' and f becomes equal to the ratio between the inductances of the coils F and F' and the impedance bridge is thereby rebalanced. Similarly, on any other movement of the core E there is a corresponding movement of the core which thus moves down and up in proportion to the up and down movements of the core E.

The indicating recording and integrating section G of the instrument comprises a supporting framework in which is mounted a rock shaft H connected to, and oscillated by the up and down movement of the core e. The connections shown for this purpose comprise a bell crank lever K which is pivotally supported on the instrument framework at K' and has one arm connected to the core e and has its other arm link-connected to an arm H' carried by the rock shaft H. K² is a counter-weight by which the moving system comprising the core e, rock shaft H, the parts carried by the latter, and the connections between it and the core e, are balanced against the activity of gravity. Mounted in the instrument framework is a rotatable shaft J carrying a disk J' against the front side of which a paper record chart J² is secured. The shaft J is rotated at a constant speed in any usual and suitable manner as by means of the electric clock motor L mounted on the instrument framework and connected to the shaft J by gearing which need not be illustrated and described. At its front end the rock shaft H carries an arm H² bent about the edge of the disk J' and provided in front of the latter with a stud shaft H³, co-axial with the shaft H, and to which is secured a recording arm J³ for tracing a record on the chart J², and an indicating pointer I which moves along a stationary scale I' when the shaft is oscillated. The connection of the recording arm J³ and the pointer I to the shaft H through the co-axial stud shaft H³, facilitates such angular adjustments of the arm and pointer relative to the shaft H as may be necessary in the calibration of the instrument.

With the simple mechanism already described, the variations in the rate of flow through the conduit C are accurately indicated and recorded. Since, as already explained, the rate of flow through the orifice C' is approximately proportional to the square root of the difference between the pressures at the opposite sides of the orifice C', equal increments or decrements in the rate of flow will not produce equal movements of the pointer I and recording arm $J^3$ in different portions of their respective ranges of movement, so that it is necessary for the scale marks I' to be of the general character illustrated with the particular forms of the magnetic cores, the coils, and the chamber A' shown. Those skilled in the art will understand, however, that by suitable changes in the relative shapes of the core parts E and e, the coils F, F', f and f', or in the shape of the chamber A', equal changes in the rate of flow through the conduit C may be caused to produce the same angular movements of the rock shaft H whether the actual rate of flow through the conduit C is large or small. The electro-magnetic means provided for transmitting the movements of the float E' to the rock shaft H, operate to make the potential drop in the coils F and f' equal to one another and hence to equalize the potential drops in the coils F' and f, and the operation is not affected by such changes in voltage between the supply conductors 1 and 2 as may occur in ordinary power and light circuits.

The meter section G comprises integrating mechanism which will now be described. The driving element of the integrating mechanism is a shaft M which may be driven by the same electric clock or other timing motor L employed to rotate the shaft J. The rotating speed of the shaft M, however, is very much higher than that of the shaft J. For example, the shaft J may well make one revolution in twelve or in twenty-four hours, while the shaft M makes one revolution every minute or so. As instrument timing mechanisms of various forms are well known, I have not thought it necessary to illustrate or describe in detail the motor L or the gearing which rotates the shaft M. Secured to the shaft M is a crank disk M' carrying a crank pin $M^2$. The latter through a link O oscillates a lever element P turning about a pivot pin or stud shaft G', carried by the instrument frame work. Pivotally connected to the lever P at P' is a latch member R. The latch member R serves during a portion of each revolution of the shaft M to lock a tripping part Q in fixed relation to the lever P. The tripping part Q is pivotally mounted on the stud shaft G' about which the lever P turns. To this end the latch bar R is provided with shoulders R' and $R^2$ adapted to bear, respectively, against a shoulder Q', and a hook-like projection $Q^2$ of the tripping member Q while the latter is free to turn about the shaft G' with the member P. Under this condition the parts are so disposed that the weight of the latch bar R and the parts connected to the latter holds the parts P, Q, and R against movement relative to one another. Once in each rotation of the shaft M, a transverse projection $Q^3$ at the free end of the tripping part Q, engages the edge S' of the arm S carried by the rock shaft H provided when the latter is out of its neutral, or no flow position. When the engagement occurs the tripping part Q is restrained from sharing the further movement in the same direction of the lever P, and the resultant relative movement of the parts P and Q then carries the projection $Q^2$ out of engagement with the shoulder $R^2$ of the latch bar R. The latter then drops until the roll U engages the periphery of the disk M as hereinafter explained. The arm S is in the form of a flat laterally flexible blade immediately in front of the plate g forming a part of the framework. To prevent the engagement of the arm S by the arm Q from producing any rotation of the shaft H, I advantageously attach to the lever P a spring arm $P^3$ on which is journaled a disk $P^2$ which rolls along the face of the plate g' and over the arm S as the lever P is oscillated. When the roller $P^2$ thus bears against the front side of the blade S, with a pressure depending on the resiliency of the spring arm $P^3$, the frictional contact between the blade S and plate g' is sufficient to prevent the blade from turning under the impact of the projection $Q^3$ of the tripping member Q, the parts being so relatively disposed that such impact always occurs while the roller $P^2$ is pressed against the front side of the blade S by the tension of its resilient supporting arm $P^3$. As soon as the latch member R is released from its normal engagement with the projection $Q^2$ of the tripping member Q, the latter ceases to exert any force against the edge S' of the plate S, since the tripping member Q is counterbalanced by a weighted arm $Q^4$.

The roll U is secured to a shaft U' journalled in a lever T pivoted to the instrument framework at $G^2$. At its free end the lever T is provided with a transverse portion $T^4$ terminating in a lip T' parallel to and in front of the body of the lever T, and overlapping the free end of the latch member R. The lip portion T' is formed with a slot $T^2$ receiving a pin-like projection $R^3$ carried by the member R. When the member R is held in fixed relation with the lever P, and the tripping member Q by the engagement of the shoulder $R^2$ with the projection $Q^2$, the roll U is held by the pin and slot connection between the members T and R out of contact with the periphery of the disk M' as shown best in Fig. 2. When the tripping member Q releases the latch member R, as shown in Fig. 3, the roll U drops into engagement with the peripheral portion $m$ of the disk M'. The peripheral portion $m$ of the disk M' is concentric with the shaft M and extends about the latter as shown, for a trifle more than 180°. The elongation of the slot $T^2$ permits such relative movement of the members R and T as is necessary to permit the roll U to drop freely into engagement with the peripheral portion $m$ of the disk M' in whatever position the member R may be when released by the tripping member Q.

A stop $G^3$ is carried by the instrument framework in position to engage the member T and prevent the latter from moving downward appreciably beyond the position in which the roll U engages the peripheral edge portions $m$ of the disk M'. The purpose of this stop is to prevent the roll U from engaging the portion of the disk M' cut away as indicated at $m'$ between the ends of the edge portion $m$. While the roll U bears on the peripheral edge portion $m$ of the disk M', the latter frictionally rotates the roll U, and the rotative movement thus imparted to the roll U is transmitted through any usual or suitable connection to an integrator or counting train X. The transmission illustrated for this purpose comprises a worm and gear connection between the roll shaft U' and a cam shaft W, the upper portion of which may comprise a flexible section. The lower end of the shaft W carries a cam W' which engages and actuates the operating arm X' of the counting train or integrator X once in each rotation of the shaft W.

The operation of the integrating mechanism is as follows: At the beginning of each operating cycle the latch part R is held by the tripping part Q in fixed relation with the lever P as shown in Fig. 1, the lever P being then at the limit of its movement in the counter clockwise direction about its supporting shaft G'. As the shaft M rotates the crank pin $M^2$, and link O turns the lever P in the clockwise direction without change in the position of the parts P, R, and Q relative to one another until the projection $Q^3$ on the tripping part Q engages the edge S' of the blade S. The point in the rotation of the disk M' at which the projection $Q^3$ engages the edge S' and releases the latch member R depends, of course, on the angular position of the shaft H and hence on the position of the magnetic core E of the actuator A. When the latch member R is released by the tripping member Q, the roll U drops into engagement with the peripheral edge portion $m$ of the disk M' and continues in engagement therewith and is thereby rotated until the continued rotation of the disk M' carries the trailing end of the edge portion $m$ out of contact with the roll U. In consequence the rotative movement imparted to the roll U and thereby the rotative movement given to the integrator shaft W during each rotation of the disk M' depends upon the angular position of shaft H at the instant at which the tripping projection $Q^3$ engages the edge S' of the blade S. When the flow through the conduit C is relatively large, the tripping member Q engages the blade S and releases the latch R early in the movement of the disk edge portion $m$ past the roll U and the movement given to the latter is correspondingly large, while when the rate of flow through the conduit C is relatively small the tripping part Q engages the blade S late in the rotation of the disk M' and the engagement between the disk edge portion $m$ and the roll U is correspondingly short.

As the lever P approaches its initial position shown in Fig. 1, the tripping member Q engages the shoulder $T^5$ of the transverse portion $T^4$ of the lever T under the thrust of the latch member R, the shoulder R' of which then engages the end of the projection $Q^2$. This lifts the free end of the lever T and thereby through the pin and slot connection between it and the latch member R, lifts the latter above the projection $Q^2$ which then moves under the shoulder $R^2$ thus relatching the parts P, R, and Q in their original condition shown in Fig. 1.

Since the blade S and tripping part Q turn about displaced axes it will be apparent that for each different angular position of the shaft H the projection $Q^3$ will engage the edge S' of the blade S at a different point along the length of the blade. In consequence of this fact it will be readily apparent to those skilled in the art that the blade edge S' may readily be shaped so that whatever the position of the blade S may be when the roll U drops into engagement with the edge portion $m$, the resultant rotative movement of the roll U will be proportional to the then rate of flow through the conduit C notwithstanding the fact that the angular displacement of the shaft H from the neutral or no-flow position of the latter is proportional not to the rate of flow through the conduit C but to the square of that rate. This required that the time of travel of the lever P from the position at which the control part Q engages the straight edge S' when the rate of flow through the conduit C is relatively high to a position at which the part Q would engage the straight edge on the same down-stroke of the lever P if the rate of flow through the conduit C were smaller, is in linear proportion to the difference between the square roots of the pressure differentials respectively impressed on the device A with the two rates of flow. A practical advantage of the invention is that with a proper relative disposition of the parts as shown in the drawing the edge S' of the blade S may be a straight edge without giving rise to any appreciable or significant error in the integration obtained. The fact that the edge S' need not be curved but may be straight obviously facilitates the manufacture and calibration of the instrument.

The flow meter disclosed herein possesses important practical advantages. The construction is simple, sturdy, and reliable in operation. Frictional resistance to the movement of its movable parts is reduced to a minimum especially as no movable parts of the mechanism pass through the walls of pressure chambers so that no friction producing stuffing box provisions are required. The total absence of electrical contacts engaging and separating as flow conditions change as well as of stuffing boxes frees the instrument from a tendency of moving parts to stick, which interferes appreciably with the attainment of the desired accuracy and sensitiveness of types of flow meters now in use and avoids all disturbing effects from variable contact resistance. The fixed positions of the impedance bridge coils and the simple straight movements of the magnetic core bodies E and e reduces lost motion and frictional resistance to a negligible minimum, and makes the action of the apparatus very definite and positive and at the same time as sensitive as may be desirable.

As already explained, the motion imparted to the core body e by the movements of the core E are practically unaffected by such slight variations in the voltage impressed on the impedance circuit as may be expected in ordinary power or light circuit from which the impedance bridge may be energized. The integrating mechanism is simple in construction, highly accurate in operation and consumes but little power. The manner in which the indicating pointer I and recording arm J are mounted and arranged avoids all possibilities of one interfering with the other and lends itself to the use of an illuminated scale and recording dial and of a broad black pointer so that the instrument indications can be easily read from some distance. Furthermore, the scale I' may be of ample length and still have its numerals vertically disposed to thereby facilitate meter readings from a distance.

The invention is capable of embodiment in apparatus differing in many of its general features as well as in details from the apparatus disclosed in Figs. 1 to 5, and in Fig. 6 I have illustrated by way of further example, a form of construction differing in numerous respects from that shown in Figs. 1 to 5. In Fig. 6 the differential pressure device AA, replacing the device A of the construction first described, comprises a U shaped container for the mercury or other sealing liquid. The device AA is connected to, and used in measuring the flow through a conduit CA which as shown includes a Venturi section to create the necessary flow measuring pressure differential. The total pressure in the conduit CA is transmitted to the upper end of the tube $A^4$ which forms an upper end extension of the leg $A^{10}$ of the device AA by a pipe $D^{10}$, while a pipe $D^{11}$ transmits the lower pressure at the throat of the Venturi section to the upper end of the leg $A^{20}$ of the device AA. Advantageously when the fluid flowing through the conduit CA is steam the device AA is located below the level of the conduit CA, so that the upper portion of the legs $A^{10}$ and $A^{20}$, the tube $A^4$ and all or the major portions of the pipes $D^{10}$ and $D^{11}$ will be filled with water of condensation, rather than steam. The portion $A^4$ of the device AA is surrounded by coils F and F' as in the construction first described though as shown the coil F' is placed above the coil F.

In Fig. 6, GA represents an instrument which may be identical with the instrument G first described, though as shown it is merely a recording instrument without integrating provisions and without the separate indicating pointer I and co-operating scale I' of the instrument G. The coils $f$ and $f'$ of the instrument GA are connected to the coils F and F' and to the supply conductors 1 and 2 as the similarly designated parts are connected in Fig. 1. Associated with the device AA and instrument GA is an indicating instrument IA comprising a disk ID of aluminum or like conducting material mounted on a shaft which carries an indicating pointer I, co-operating with a scale I'. The disk ID is rotated into positions corresponding to the different rates of flow of the fluid metered by the opposing action on the disk ID of electro-magnets IB and IC. The energizing windings $i$ and $i'$ of the electro-magnets IB and IC, respectively, are connected in parallel with the windings $f$ and $f'$ of the instrument GA. The electro-magnets IB and IC have C-shaped cores between the poles of which the plate ID extends. One pole piece of each magnet is bifurcated and has one fork surrounded by a short circuited conductor or shading coil IE.

The cores and shading coils IE of the two electro-magnets IB and IC are so disposed that the alternating current flow through the coil $i$ creates a reaction between the disk ID and the magnet IB tending to rotate the disk in the counter-clockwise direction, while the alternate current energization of the coil $i'$ creates an interaction between the magnet IC and the disk ID tending to rotate the disk ID in the clockwise direction. As the fluid flow through the conduit CA increases with a resultant increase in the current flow through the coil $i'$ and a simultaneous decrease in the amount of current flowing through the coil $i$, the disk ID and the pointer I are consequently moved in the clockwise direction. To insure a definite position of equilibrium of the pointer I for given current flows through the coils $i$ and $i'$, the aluminum disk ID is so shaped that the area of the portion of the disk in inductive relation with the core of the magnet IC will diminish relative to the area of the portion of the disk ID in inductive relation with the core of the magnet IB as the disk ID rotates in the clockwise direction and swings the pointer I away from the zero position of the latter. In the condition shown in Fig. 6, in which core E is in its middle position and the currents in the coils $i$ and $i'$ are equal, the portions of the disk ID between the poles of the two magnets IB and IC are of the same area.

The similar responses of the instruments GA and IA to changes in the fluid flow through the conduit CA illustrates the fact that any suitable form of differential volt meter may be employed as the actuating element of the exhibiting instrument, whether that instrument be a simple indicator like the instrument IA, a simple recorder like the instrument GA, or an indicating, recording and integrating instrument like the instrument G. A characteristic advantage of the type of circuit connections employed is that two or more instruments may have their energizing windings $f, f'$; $i, i'$; etc. connected in parallel without material effect on one another, or on the amount of current flow through the winding F, F' of the differential pressure device. This facilitates the location in different positions of a plurality of different exhibiting instruments responsive to the same differential pressure device.

In the form of integrating mechanism employed in the instrument shown in Figs. 1 to 5, the energy required for operating the integrating mechanism is transmitted by the frictional contact between the disk M' and the roll U. The necessary power may be transmitted in this way in some instruments, and particularly with certain simple forms of integrating mechanism such as the simple counting trains employed in ordinary watt meters. With other types of integrating mechanism, and particularly those including a considerable number of counting wheels $X^2$ arranged side by side as in the integrator X, the energy required for the operation of the integrator is sufficient to create an undesirable tendency to slippage between the disk M' and the roll U. To eliminate this tendency without increasing the contact pressure between the roll U and disk M', or the power transmitted through the roll U, I may employ the modified forms of integrating mechanism shown in Figs. 8 to 12 inclusive.

The instrument GB shown in Figs. 8 to 11 may be identical with the instrument G first described except in respect to the manner in which the rotation of the shaft U' of the roll U actuates the integrator X. The integrator X of the instrument GB has its operating arm X' oscillated by a link Y' connecting the arm X' to a lever Y pivoted to the instrument framework and having a shoulder $Y^2$ engaging the periphery of a cam $Z^2$. The latter is loosely mounted on a shaft Z but is intermittently locked to the shaft by means of a pawl $Z^3$ pivotally connected to the cam $Z^2$, and also connected to the latter by a spring $Z^4$ which tends to pull the pawl into the position in which it engages a ratchet wheel Z' secured to the shaft Z and thereby locks the cam $Z^2$ to the shaft Z. The shaft Z is constantly rotated at a suitable speed, say two revolutions an hour, as by the motor L employed to rotate the disk M' of the instrument. During a portion of the time the pawl $Z^3$ is held out of engagement with the ratchet disk Z' by an escapement cam $W^2$ carried by the shaft W. The cam $W^2$ is formed with a peripheral notch $W^3$ moved once in each revolution of the shaft W into position to permit the detent $Z^5$ carried by the free end of the pawl $Z^3$ to pass through the notch under the action of the spring $Z^4$. When this occurs, the pawl locks the cam $Z^2$ to the shaft Z and the cam then makes one turn, which again brings the detent $Z^5$ into engagement with the side of the cam $W^2$. It will be understood that the apparatus is to be so proportioned that with the maximum rate of fluid flow to be metered the angular velocity of the shaft W will be not greater than the angular velocity of the shaft Z.

The construction shown in Fig. 8, includes a lever $Z^6$ pivoted to the instrument framework and pressed against the periphery of the cam $Z^2$ by a spring $Z^7$, the cam $Z^2$ and lever $Z^6$ being so relatively shaped and disposed that as the detent $Z^5$ engages the side of the cam $W^2$ the free end of the lever $Z^6$ will drop off the end of the high portion of the cam $Z^2$ and will slide down the approximately radial edge $Z^{20}$ of the cam $Z^2$, and thereby give the later a slight further rotative movement sufficient to quickly and positively separate the pawl $Z^3$ and ratchet wheel Z', and sufficient to return the cam into the exact position shown in Fig. 8. In this position of the cam $Z^2$, the cam engaging projection $Y^2$ of the lever Y rests upon the highest point of the cam $Z^2$ so that only a very small turning movement of the cam $Z^2$ is required when the detent $Z^5$ next passes through the notch $W^3$ of the cam $W^2$ and relocks the cam $Z^2$ to the shaft Z, to permit the lever Y to drop and thereby actuate the integrator X through the link Y'. In the construction shown in Fig. 8, the shaft W carries a counting wheel $W^4$ arranged adjacent the integrator so that the numbers $W^{40}$ marked on the periphery of the wheel $W^4$ may be read with the visible numbers on the number wheels $X^2$ of the integrator X to thereby constitute the complete integrator reading. If the circular series of numbers $W^{40}$ carried by the wheel $W^4$ ran from 0 to 9, the adjacent first wheel $X^2$ of the integrator X proper would be a tens wheel, while if the wheel $W^4$ is intended, as shown, to indicate flow quantity units from 0 to 100, the first wheel $X^2$ of the integrator X proper would be a hundreds wheel.

To avoid false readings, it is obviously necessary that the arm $X'$ of the integrator X should be actuated to thereby advance the first integrator wheel $X^2$ one step at the very instant at which the wheel $W^4$ turns into its zero position. This result is secured with the apparatus shown in Figs. 8 to 11 by means of the provisions made for actuating the integrator arm $X'$ immediately after the detent $Z^5$ passes through the notch $W^3$ of the cam $W^2$, and the interlocking provisions between the integrator X and wheel $W^4$, and the yielding connection formed by the spring $W^5$ between the shaft W and wheel $W^4$. The interlocking provisions referred to comprise an arm $W^6$ carried by the wheel $W^4$ and a stop projection $X^3$ carried by the actuating arm $X'$ of the integrator X. With the parts in the position shown in Fig. 8, the stop arm $X^3$ is in the path of movement of the arm $W^6$ and is engaged by the latter as the wheel $W^4$ approaches closely to its zero position. When such engagement occurs the spring connection $W^5$ which normally holds the wheel $W^4$ in fixed relation to the shaft W, yields to permit any slight further movement of the shaft W which should thereafter occur before the projection $Y^2$ of the lever Y drops off of the high point of the cam $Z^2$. As soon as the lever Y drops and thereby moves the integrator arm $X'$ the stop projection $X^3$ is carried out of the path of movement of the arm $W^6$.

The arrangement shown in Figs. 8 to 11 permits of integrator readings, furnished jointly by the integrator X and the wheel $W^4$, running to high numbers and which are easily read. The mechanism required to obtain such easily read readings requires considerable energy for its operation in comparison with simple counting trains employed in ordinary watt and gas meters, but the operation of this mechanism requires but little energy to be transmitted by the frictional contact between the disk $M'$ and roll U.

Where the maximum number to be shown by the integrator is not greater than can be readily shown by the integrator X, and the advantage of an independent power or relay actuation of the integrating mechanism is desired, that result can be obtained with such apparatus as is shown in Fig. 12. The apparatus shown in Fig. 12 differs from that shown in Figs. 8 to 11 primarily in the omission of the wheel $W^4$ and of the lever $Z^6$. With the arrangement shown in Fig. 12, the parts are preferably so relatively proportioned and arranged that as the pawl $Z^3$ after revolving about the shaft Z engages the cam $W^2$, the projection $Y^2$ of the lever Y will drop off of the high point of the cam $Z^2$ and slide down the radial cam edge $Z^{20}$ and thereby angularly advance the cam as required to promptly and positively disengage the ratchet wheel $Z'$ and pawl $Z^3$. In Fig. 12 the actuator arm $X'$ of the integrator is thus operated not at the beginning but at the end of each rotation of the cam $Z^2$.

The flow meter mechanism proper, disclosed, but not claimed herein, for actuating the exhibiting mechanism in accordance with changes in the rate of flow measured, is claimed in my divisional application Serial No. 106,346, filed May 3, 1926.

While in accordance with the provisions of the patent statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In an integrating meter, the combination of a meter element moving in response to changes in the quantity metered, a driving element, a member, means for giving said driving element and member regularly recurring synchronous cyclic movements, an integrator actuator driven by said driving element while in contact with the latter, a part adapted to be moved into engagement with said meter element by said member at a stage in each cyclic movement of the latter depending on the position of said meter element and adapted to releasably engage said actuator and hold the latter out of contact with said driving element during a portion of the movement of said member preceding said engagement and adapted to release said actuator when said engagement occurs, and means for reestablishing the releasable engagement of said part and actuator at a predetermined subsequent stage in the cyclic movement of said member.

2. In an integrating meter, means providing a surface, a blade-like meter element parallel to and movable along said surface into different positions corresponding to different values of the quantity metered, a member adapted while crossing said element to hold the latter in frictional engagement with said surface, means for giving said member a cyclic movement along a path crossing said element at one point or another dependent on the position of the latter, and an integrating mechanism control part adapted to be moved by said member into operative engagement with said element while the latter is held in frictional engagement with said surface by said member.

3. In an integrating meter, the combination of an oscillating lever, means for giving the latter regularly recurring oscillatory movements, a latch member pivoted on said lever, a tripping part pivotally connected to said lever and adapted to interlock with said latch member and thereby hold the tripping part and latch member in fixed relation with said lever, a meter element adjusted to different positions in response to changes in the value of the quantity metered and adapted to be engaged by the tripping part and thereby cause the latter to release the latch member at a stage in the movement of the lever dependent on the position of said element, and integrating means set into operation by said latch member when the latter is released.

4. In an integrating meter, the combination of an oscillating lever, means for giving the latter regularly recurring oscillatory movements, a latch member pivoted on said lever, a tripping part pivotally connected to said lever and adapted to interlock with said latch member and thereby hold the tripping part and latch member in fixed relation with said lever, a meter element adjusted to different positions in response to changes in the value of the quantity metered and adapted to be engaged by the tripping part and thereby cause the latter to release the latch member at a stage in the movement of the lever dependent on the position of said element, integrating means actuated by said latch member when the latter is released, and means for relocking said latch member and tripping member in a subsequent stage of the movement of said lever.

5. In an integrating meter, a plate-like support, a blade-like meter element parallel to and movable along one side of said support into different positions corresponding to different values of the quantity metered and comprising a portion projecting beyond the edge of said support, a member, means for giving said member a cyclic movement along a path crossing said element at one point or another dependent on the position of the latter and comprising means for pressing said element into frictional engagement with said surface while crossing said element, and a control part moved by said member into operative engagement with said projecting portion of said element while the latter is held in frictional engagement with said support.

6. In an integrating meter, the combination with a pivoted meter element pivoted to turn about an axis into different positions corresponding to different values of the quantity metered, a member pivoted to turn about a second axis, a lever pivoted to turn about a third axis, means for rotating said member about its axis and for giving said lever a to and fro movement about its axis once for each revolution of said member, an integrating actuator wheel adapted to be rotated by said member when in contact therewith, a support for said actuator pivotally connected to said lever, a tripping part pivotally connected to said lever and adapted to releasably interlock with said support to hold the latter and said tripping part in fixed relation with the lever with said actuator out of engagement with said member, said tripping part being moved by said lever when interlocked with said support into engagement with said element at a stage in the movement of the lever dependent on the position of said element and releasing said support on said engagement thereby permitting said actuator to engage said member, and means for relocking said support and tripping part in said fixed relation with said lever when the latter reaches a subsequent stage of its movement.

7. In an integrating meter, the combination of a meter element comprising a practically straight edge and pivoted to turn about an axis into different positions indicating correspondingly different values of the quantity metered, a member pivoted to turn about an axis laterally displaced from the first mentioned axis, means for giving said member regularly timed periodic movements about said second axis, and a control part moved by said member into engagement with said straight edge at a stage in each recurring movement of said member dependent on the position of said element, all so relatively disposed that the time required for the travel of said part from a position of straight edge engagement occurring at an early stage in any recurring movement of said member to a position of straight edge engagement occurring at a later stage in said movement is in linear proportion to the difference between the square roots of the values respectively indicated by said element when in the positions to effect said straight edge engagements.

8. In a meter having a meter shaft rotating in proportion to the integrated value of the quantity metered, the combination with said shaft of mechanism for measuring its rotative movements comprising a counting train, a power shaft, and means controlled by said meter shaft for intermittently connecting said counting train to said power shaft.

9. In a meter having a meter shaft rotating in proportion to the integrated value of the quantity metered, the combination with said shaft of mechanism for measuring the rotative movements of said shaft comprising a counting train, a power shaft, a cam loosely mounted on the latter, means actuated by said cam for operating said train when said cam is rotated, and means controlled by said meter shaft for intermittently locking said cam to said power shaft.

10. In a meter having a meter shaft rotating in proportion to the integrated value of the quantity metered, the combination therewith of a number wheel carried by said shaft, a counting train in proximity to said number wheel and cooperating with the latter to show the revolutions given to said shaft, a power shaft, and means controlled by said meter shaft for intermittently connecting said power shaft to said counting train once during each revolution of the meter shaft.

11. In a meter having a meter shaft rotating in proportion to the integrated value of the quantity metered, the combination with said shaft of a number wheel mounted in said shaft, a yielding connection between said number wheel and shaft normally holding said wheel in fixed angular relation with said shaft but yielding to permit a partial rotation of the shaft while the rotative movement of the wheel is arrested, a counting train associated with said number wheel, means controlled by the meter shaft for actuating said counting train once for each revolution of the meter shaft, and means arresting the movement of the number wheel during a period in which said counting train is being actuated.

12. In a meter having a meter shaft rotating in proportion to the integrated value of the quantity metered, the combination with said shaft of a number wheel mounted on said shaft, a yielding connection between said number wheel and shaft normally holding said wheel in fixed angular relation with said shaft but yielding to permit a partial rotation of the shaft while the rotative movement of the wheel is arrested, a counting train associated with said number wheel, a power shaft, a cam loosely mounted thereon, means controlled by the meter shaft for locking said cam to said power shaft once for each revolution of the meter shaft, means for giving said cam an angular movement in advance of the power shaft as the cam completes a revolution and thereby release said cam from the power shaft, and means actuated by the cam for operating said counting train on each revolution of the cam.

13. In an integrating meter comprising a pivoted meter element given oscillatory movements by changes in the value of a quantity metered which movements are in non-linear relation to said changes, means for totalizing the value of said quantity comprising a counting train, a rotating member, a rock member, a link connection between said members through which the rotation of the rotating member rocks said rock member, and means jointly controlled by said rock member and meter element for causing said counting train to be actuated by said rotating member during a portion of each rotation of the latter dependent on the then position of said element.

14. In an integrating meter, a counting train, means for actuating said train in a definite non-linear relation to the value of the quantity metered comprising a power driven rotating member, a rock arm, and a link connecting said member and rock arm whereby the latter is oscillated by the rotation of the former, said parts being so proportioned that the angular movements of said member during a part of each rotation of said member and rock arm are in said non-linear relation to one another.

15. In an integrating meter, the combination with a meter element angularly displaced from a zero position by an amount varying with the square of the value of the quantity metered, a counting train, and means for periodically actuating it to an extent proportional to the square root of the then displacement of said element comprising a power driven member, a rocking member, a link connection between said members whereby the rotation of the rotating member rocks said rocking member, and means jointly controlled by said rocking member and element for operatively connecting said counting train to said rotating member during a portion of each rotation of the latter dependent on the position of said element.

16. In an integrating meter, the combination with a meter element having a controlling edge and angularly displaced from a zero position by an amount varying with the square of the value of the quantity metered, a counting train, and means for periodically actuating it by an amount proportional to the square root of the then displacement of said element comprising a power driven member, a rocking member, a link connection between said members whereby the rotation of the rotating member rocks said rocking member, and means jointly controlled by said rocking member and element for operatively connecting said counting train to said rotating member during a portion of each rotation of the latter dependent on the position of the said edge, the latter being approximately straight but departing from a straight edge slightly as required to insure the desired actuation of said counting train.

Signed at Philadelphia, in the county of Philadelphia and State of Pennsylvania, this 23rd day of December, A. D. 1925.

THOMAS R. HARRISON.